(12) United States Patent
Zellweger

(10) Patent No.: US 9,665,637 B2
(45) Date of Patent: May 30, 2017

(54) METHOD AND APPARATUS FOR CREATING BINARY ATTRIBUTE DATA RELATIONS

(76) Inventor: H. Paul Zellweger, Rochester, MN (US)

( * ) Notice: Subject to any disclaimer, the term of this patent is extended or adjusted under 35 U.S.C. 154(b) by 0 days.

(21) Appl. No.: 13/033,298

(22) Filed: Feb. 23, 2011

(65) Prior Publication Data

US 2012/0215768 A1    Aug. 23, 2012

(51) Int. Cl.
  *G06F 7/00*    (2006.01)
  *G06F 17/30*   (2006.01)

(52) U.S. Cl.
  CPC .. *G06F 17/30595* (2013.01); *G06F 17/30392* (2013.01)

(58) Field of Classification Search
  None
  See application file for complete search history.

(56) References Cited

U.S. PATENT DOCUMENTS

| | | | |
|---|---|---|---|
| 5,621,903 A * | 4/1997 | Luciw et al. | 715/708 |
| 5,630,125 A | 5/1997 | Zellweger | |
| 5,664,173 A | 9/1997 | Fast | |
| 5,802,514 A * | 9/1998 | Huber | 715/769 |
| 5,873,093 A * | 2/1999 | Williamson et al. | |
| 6,014,138 A * | 1/2000 | Cain et al. | 715/826 |
| 6,061,692 A | 5/2000 | Thomas et al. | |
| 6,131,098 A * | 10/2000 | Zellweger | 707/802 |
| 6,131,100 A * | 10/2000 | Zellweger | |
| 6,243,700 B1 * | 6/2001 | Zellweger | |
| 6,279,005 B1 * | 8/2001 | Zellweger | G06F 17/30994 |
| 6,301,583 B1 * | 10/2001 | Zellweger | 715/810 |
| 6,401,096 B1 * | 6/2002 | Zellweger | 707/702 |
| 6,424,980 B1 * | 7/2002 | Iizuka et al. | 715/206 |
| 6,985,905 B2 * | 1/2006 | Prompt et al. | 707/829 |
| 8,260,731 B2 * | 9/2012 | Maruyama et al. | 706/20 |
| 2008/0086498 A1 * | 4/2008 | Sureka | G06F 17/30587 |
| 2008/0114785 A1 * | 5/2008 | Bernstein | G06F 17/30569 |
| 2009/0248671 A1 * | 10/2009 | Maruyama et al. | 707/5 |

(Continued)

OTHER PUBLICATIONS

Burgin, Mark. Theory of Named Sets. New York: Nova Science Publishers Inc, 2011.

(Continued)

*Primary Examiner* — Tuan A Pham

(57) ABSTRACT

Advances to the techniques used to generate menu data for the content menu (5) are disclosed. All of these advances center on an improved format of meta-query data that is based on Binary Attribute Relations or BAR (120). When the BAR is applied to a BAR query (121) it exposes Binary Attribute Data Relations or BADR (250) that have been hidden from view until now. All three of these new constructs: the BAR (120), BAR query (121) and BADR (250), complement one another and streamline the production of menu data files (24) used by the content menu (5). These advances improve the overall efficiency in generating menu data for the content menu by enabling a single algorithm fetchBADR (200) to fetch binary attribute data relations for one algorithm that compiles menu data (160) and for another that generates this menu data for the content menu at runtime (200). This approach makes all three of these algorithms easier to maintain and to deploy.

17 Claims, 11 Drawing Sheets

(56) References Cited

U.S. PATENT DOCUMENTS

2010/0205052 A1* 8/2010 Lu et al. .................... 705/14.16
2010/0211564 A1* 8/2010 Cohen et al. ................ 707/722
2011/0208759 A1* 8/2011 Zellweger .................... 707/754

OTHER PUBLICATIONS

Zellweger, Paul. The Aleph Data Relation in Structured Data, A Tree within a Tree Visualization. Visual and Data Analysis. San Fransisco, CA Feb. 14, 2016, p. 1-1(1), ISSN 2470-1173.

* cited by examiner

Fig. 4a

| BID (42) | AID (43) | Book_Title (44) | Book_Language (45) | PID (46) | |
|---|---|---|---|---|---|
| A | 1643 | Architecture In Scotland | English | 617 | 47a |
| B | 1643 | British Craftsmanship | English | 864 | 47b |
| C | 1102 | Francis Rattenbury and BC | English | 617 | 47c |
| D | 1023 | Schweizer Wohnhauser | German | 140 | 47d |

Fig. 4b

| AID (51) | Author (52) | Author_City (54) | Author_Country (55) |
|---|---|---|---|
| 1643 | West, T.W. | Boston | United States |
| 1102 | Liscombe, C.W. | Toronto | Canada |
| 1023 | Meyer, Peter | Zurich | Switzerland |

Fig. 4c

| PID (61) | Pub_Name (62) | Pub_City (64) | Pub_Country (65) |
|---|---|---|---|
| 617 | McKay | New York | United States |
| 864 | Collins | London | England |
| 140 | Grisberger | Zurich | Switzerland |

| NODE (105) | TOPIC (106) | PARENT (107) | CHILD (108) | SIBLING (109) |
|---|---|---|---|---|
| 70 | [ root node ] | NULL | 71 | NULL |
| 71 | Author | 70 | 75 | 72 |
| 72 | Language | 70 | 79 | 73 |
| 73 | Publisher | 70 | 81 | 74 |
| 74 | Title | 70 | 85 | NULL |
| 75 | Liscombe, R.N. | 71 | 89 | 76 |
| 76 | Meyer, Peter | 71 | 90 | 77 |
| 77 | West, T.W. | 71 | 91 | NULL |
| 79 | English | 72 | 93 | 80 |
| 80 | German | 72 | 96 | NULL |
| 81 | Collins | 73 | 97 | 82 |
|  |  |  |  |  |
| 100 | Francis Rattenbury | 83 | C | NULL |

PRIOR ART

Fig. 6

METHOD AND APPARATUS FOR CREATING BINARY ATTRIBUTE DATA RELATIONS

Atzeni, Paulo, Stefano Ceri, Stafano Paraboschi and Riccardo Torlone. *Database Systems, Concepts, Languages, and Architectures*. Berkshire, England: McGraw-Hill Publishing Company, 2000, pp. 21-22.

Biggs, Norman. *Discrete Mathematics*. Oxford, England: Oxford University Press, 1996, pp. 193-194.

Burgin, Mark. "Theory of Names Sets as a Foundational Basis for Mathematics" in Diez, A., J. Echevarria, A. Ibarra (eds.) "Structures in Mathematical Theories, Reports of the International Symposium." Universidas del Pais Vasco: Sep. 25-29, 1990, p 417.

Codd, E. F. A Relational Model of Data for Large Shared Data Banks. *Communications of the ACM,* 13(6), 1970, pp. 377-387.

Codd, E. F, Extending the Database Relational Model to Capture More Meaning, *ACM Transactions on Database Systems,* 4(4), 1979, pp. 397-434.

Knuth, D. The Art of Computer Programming, v. 2: Seminumerical Algorithms, Boston, Mass.: Addison-Wesley, 1997, p. 348.

Newell, Allen and Herbert Simon, "Computer Science as Empirical Inquiry: Symbols and Search, *Communications of the ACM,* March 1976, 19, 3, pp. 113-126.

Zellweger, Paul. A Database Taxonomy Based On Data-Driven Knowledge Modeling. (IEEE) KIMAS'05 Waltham, Mass., pp. 469-474.

BACKGROUND

In 2000, Zellweger (U.S. Pat. No. 6,131,098) introduced a novel way to navigate over database content using a content menu. This end-user interface organizes data and data relations found in the database according to the open hierarchical data structure (OHDS), a list of nested lists, first described by Zellweger (U.S. Pat. No. 5,630,125) in 1997. The OHDS is similar to the "[LEFT child—RIGHT sibling]" data structure described by Knuth, but Zellweger's implementation of this structure goes well beyond the simple functionality of memory management tool. Having its own interactive development system and a comprehensive set of tools for managing data-topic lists, menu developers can add menu topics either by hand, by algorithms that extract data and data relations from a database, or by combinations of both.

Over the past decade, the construction of the OHDS served as a framework for improving the algorithms that automate menu data for the content menu. The data mapping algorithm used to build the OHDS is recursive. Each recursive call extracts a list of data-topics from a remote database and adds it to a leaf node in the OHDS. By systematically branching out from each leaf node at the bottom of the structure, this technique is similar to the tree-growing methodology described by Biggs which mimic the depth-first search. By carefully observing these operations, the OHDS provided an opportunity for seeing how runtime data-topic lists could be added to the content menu, along with numerous other improvements, including U.S. Pat. Nos. 6,234,700 and 6,301,583.

Early on Zellweger was able to show how to automatically generate a network of data-topic lists for the OHDS. This included using a dedicated interactive menu (U.S. Pat. No. 6,131,100) and specialized software (U.S. Pat. No. 6,279,005). In U.S. Pat. No. 6,131,100, a newly disclosed GUI enables the menu developer to navigate over a target database and to create a series of "logical" relationships between a pair of database attributes. In turn, these logical relationships could be represented by a symbolic expression. Program logic disclosed by U.S. Pat. No. 6,279,005 shows how to parse this expression to capture meta-query data. This data is used to construct a query statement at runtime that extracts lists of data-topics from a remote, target database. Improvements to these advances include U.S. Pat. No. 6,131,098 that parses this symbolic expression to extract meta-query data and stores it in its own structure. These new improvements enable the same meta-query data to generate a OHDS for compiled menu data files or for creating menu data for the content menu at runtime.

The current disclosure introduces a number of new improvements over all of this prior art. These improvements are all essentially based an entirely new perspective on meta-query data. This new perspective on meta-query data was inspired by Burgin's mathematical theory of named sets. This advanced mathematical theory was instrumental in the development of binary attribute relations (BAR) and in shaping the details for a new model of meta-query data. This new format is presented in this disclosure. At the core of this new disclosure is the discovery of a uniform pattern of data relations in all database applications that can be represented by a new meta-query query model. This uniform pattern of data relations is identified here as binary attribute data relations, and they will be described shortly.

At this point in this disclosure, it is important to point out how two other discoveries relate to these data relations, and to each other. These two discoveries are: 1) a simplified retrieval operation called a BAR query that extracts data relations according to meta-query data, and 2) the fact that these data relations can be classified according to how they contribute to the construction of the OHDS. Therefore, these two additional discoveries are, in fact, so closely intertwined with each other that one discovery could not be made independent of the other. The BAR query, a simplified retrieval operation, lends itself to the construction of the OHDS; and the OHDS in turn reveals the nature of data relations in the database and how they can be enumerated and classified according to four distinct types.

Clearly, these four different types of data relations occur routinely in everyday programming, and they could be extracted from a database using less efficient algorithms. But they could never have been discovered, let alone classified in such a systematic or unified manner, without the BAR query, and without the knowledge of their role in the construction of the OHDS.

As indicated earlier, the BAR and the BAR query are applications of Burgin's theory of named sets (BNS), a mathematical modeling tool more fundamental than set theory, the dominant mathematics behind the relational data model. BNS assumes that all systems are composed of interrelated components or subsystems that are logically related by "rules." In the case of the relational database, these components include a pair of attributes in a relational table and the rules imposed by a simple SQL SELECT that bind the two attributes together.

It is important to note that the binary attribute data relations introduced by this disclosure occur naturally between two attributes in every database table. As indicated above, they could only be derived from a well-defined, carefully crafted retrieval operation like the BAR query. The inventor discovered the logical relationship established by the BAR query as a data relation between an input data condition and its data. He calls this relationship a binary attribute data relations or BADRs.

With these new understanding in place, this disclosure is now in a better position to identify four different types of data relations that exist in all database applications. Before proceeding to the disclosure itself, however, it is important to point out why these data relations have remained hidden from view. One reason for their obscurity is that the BAR query is essentially a new tool, one that until now has never been considered. Another reason for their obscurity is that the data mapping between an input condition and its data output is entirely deterministic, the actual number of data in the output is completely unpredictable and arbitrary.

For example, in a BAR query with an input condition COLOR=red, the retrieval operation logically binds a single data value red with the COLOR attribute. In a database table, however, there may be multiple instances of red at various record, row or tuple locations. Yet, the BAR query statement treats all these matching values mathematically as an instance of one, according set theory. In contrast, data output from this query can be one or many depending upon the number of red locations in the table, and on the number of unique data values associated with the output attribute. This means that the data mapping between input and output attributes can take the form of "one-to-one" or "one-to-many," regardless of the database table declaration or the samples of data considered. Therefore, arbitrary nature of these data relations makes them difficult to "see" and to "identify," particularly through the lens of set theory because it has no way of modeling them.

But from the perspective of the content menu, this output data plays an essential role in construction of the OHDS regardless of whether they take the form of "one-to-one" or "one-to-many." What also makes a difference is whether the output from a BAR query data represents data-topics that would be relevant or meaningful to an end-user. This raises another important point, namely that some of this output data only serves as links to data-topics, representing two of the four different types of binary attribute data relations. Therefore, without the OHDS, the difference between these four different types of data relations could not have been made.

A careful analysis of the construction of the OHDS and of the BAR query afforded other discoveries as well, including a more precise understanding of the nature of relational data. In particular, this understanding includes the notion that all relational data is composed of two system-based aspects: physical-values and constructed-types. The inventor identifies these two aspects of this data as meta-symbols that represent the mechanical way the database processes input and output data. The input condition on an input attribute relies on "pattern matching" 0's and 1's to locate relevant records in the database. Operationally, this matching occurs in the Arithmetic logic unit of ALU of the computer's CPU by comparing an input text condition with record components. In contrast, the output attribute focuses on the "naming" function of an attribute label that refers to pools of data symbols in a database table. Therefore, the inventor views all input services as being based on the physical-value of data-symbols and all output as being based on constructed objects that manage them. With this deeper understanding of relational data brought about by the awareness of a division of labor between input and output, all retrieval operations on structured data can now be generalized across all different types of regardless of any data model.

Therefore, all retrieval operations, including relational queries such as the SQL SELECT, can and should be viewed as an input/output interface to an algorithm. The input and output channels themselves align with the phenomenon of meta-symbols: with physical data values used to match input patterns, and with constructed-types, such as attributes, for extracting data from a pool of values by an attribute name. At the data level, differentiating input and output data by how the database functions internally gives shape and form to the BADR discovered by the inventor. First, by showing how each one contributes to the construction of the OHDS. Output provides sibling lists and input physical-values furnishes the means for linking these lists to leaf nodes in this structure. Next, by characterizing these two attributes as a source and destination, this new logical relationship draws attention to the mapping between such input and output data.

In the database literature, the inventor's input and output view of retrieval operations is somewhat consistent with the more general concept of query mapping that refers to input and output schema mapping (Abiteboul et al.). However, in the inventor's case, this mapping is quite specific as it refers to input and output data. This takes us well beyond today's theoretical understanding of database queries, relational data, and even the notion of physical symbols according to Simon and Newell, as all of these various concepts have never been studied together from the perspective of data relations.

These two refinements (all queries simply refer to input and output and the fact that this i/o can easily be modeled by the BAR symbolic expression) help clarify and articulate data relations in the relational database. Until now, this area has been unexplored by the database research community. By focusing on the mapping between input data and data output from a BAR query, and the fact that this data relationship can be arbitrarily either one or many, these data relations could only emerge and unfold when the OHDS and its construction was taken into consideration. Therefore, this data mapping could only exist within the carefully constructed framework of a BAR query and of an OHDS, making the discovery of this data mapping the subject for this new art, with the BAR query the predicate and the content menu its object.

The discovery of binary attribute data relations or BADRs provides an entirely fresh, new look at the data and data relations in a database. This new perspective lays the foundation for a more tightly integrated approach toward generating menu data for the content menu. By design, this new approach improves upon the prior techniques in a number of significant ways. First, with the BAR query as a focal point for extracting menu data from a database, the algorithms that populate the OHDS can be more streamlined and compact. They are also considerably easier to maintain. Second, now that the nature of relational data is better understood. and more precise in terms of retrieval operations, improvements could be made to the format of meta-query data and to the way it is collected and stored. Third, by separating the BAR query from the algorithms that build the OHDS, this simple query could now generate menu data for runtime list menus as well.

Finally, with the discovery of binary attribute data relations, the inventor was able to identify the rules that govern attribute and data relations. By analyzing these rules, new insights about the nature of data relations can be made. One such insight that can be attributed to this discovery is that the semantic relations in the newly discovered data relations that fall into two broad categories: contextual information and conceptual linkage. Another important insight focuses on how different pairs of attributes can create different types of data relations that contribute to the construction of the OHDS.

What makes this disclosure so exceptional is the fact that the binary attribute relation or BAR challenges a longstanding position in the research literature. In 1978, Codd, the inventor of the relational database, argued against extending any semantic analysis within a relational table at the attribute level. The reason for his strongly worded position is that he considered the relational table to be semantically "atomic" p. 413. At best, he was ambivalent about even considering something like the binary attribute relations because he did not see any point to such speculation. Since then, however, no one has been able to show how attributes within the same table could form any relevant semantic relationships that would challenge Codd's. Database researchers have not even considered the possibility that a semantic relationship could exist between two attributes. Nor had they considered that any two attributes in a relational table could form a logical relationship that could express the underlying relationship of their data. Fortunately, however, these two topics are taken up by the present disclosure in a concrete and pragmatic way with the content menu.

Therefore, this disclosure breaks new ground by providing hard evidence, from the perspective of the content menu, that BADRs are both useful and meaningful. At the data level, the BAR query yields BADRs which provide the essential building blocks for constructing a database taxonomy. At the attribute or naming level, the input and output functions of the BAR query frame the terms in the BAR notation in a new light. That is, the input and output attributes in a BAR query can be applied directly to the formation of a BAR expression. Furthermore, the attribute, and its underlying data, can also now be viewed as a resource that can either describe something about the content in a database, say when the attribute SIZE manages data such as small or medium. Or that these resources can be employed as links to such descriptions for end-users. This new distinction between attribute data describing versus linking provides the means to classify attributes—and their data—operationally as either conceptual or operational, according to how an attribute, in a sequence of attributes selected by a developer, contributes to the construction of the content menu.

This classification of attributes and their data as being either conceptual or operational is essential in showing how binary attribute data relations or BADR characterize semantic relations. When data-symbols from two conceptual attributes both describe something, such as "Boston" and "Massachusetts," they establish a particular type of semantic relationship that is identified here as contextual information. Together these two data-symbols not only describe something modeled by the database table, they also provide a contextual setting that clarifies each term. Case in point, they refer to a specific town in a particular state. Other semantic relations are also possible. For instance, when a data-symbol from an operational attribute links to another data-symbol (a description or another link) that establishes another type of semantic relationship that is identified here as conceptual linkage. This other type of relationship eventually links to conceptual information. In the construction of the OHD, all operational data is stripped away in order to display only data-symbols that will inform end-users about what they can expect to find in the database. Thus, one can see how these two semantic expressions are functionally related, and how the concepts of the BAR query and the BADR are mutually dependent upon each other, in a complementary way, for the discovery of their respective identities.

SUMMARY

In accordance with one embodiment of the present invention, notably the relational database, this disclosure shows how to improve the design and efficiency of the algorithms in the development system that are responsible for generating menu data files for the previous art of the content menu. These improvements in turn pave the way for alternative embodiments of a content menu development system that can capture and store meta-query data from other data models.

DRAWINGS—BRIEF DESCRIPTION OF THE FIGURES

FIGS. 4a through 4c depict the sample database that will be used to demonstrate this new art.

FIG. 6 depicts the storage format of OHDS.

FIG. 12a through 12d graphically depict the four different types of binary attribute data relations or BADR.

DETAILED DESCRIPTION

Figure 1:
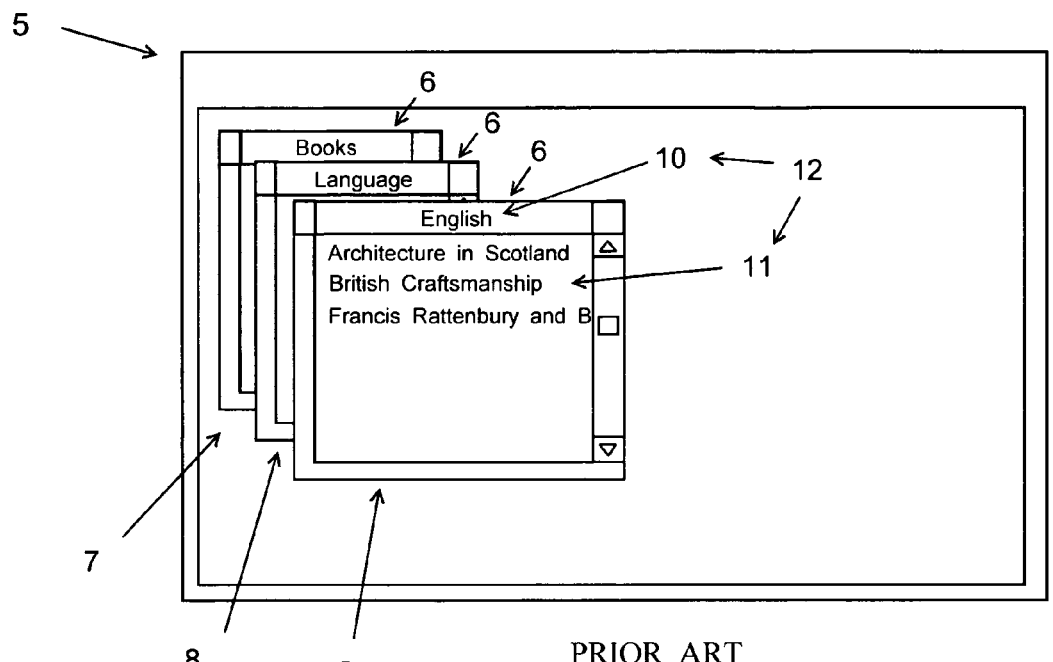
FIG. 1 depicts the content menu, an end-user database interface that organizes the data and data relations into a database system

An embodiment of content menu 5 is depicted graphically in FIG. 1. The graphical user interface (GUI) of content menu 5 consists of one or more nested topic list menus 6 that display data and data relations in a database. In content menu 5, each list menu 6, such as 9, consists of a list menu header 10 and one or more related topic items in the scrolling display area 11 in 9. The relationship between menu header 10 and list 11 of related data-topics is significant because it represents data relation 12, one of the four Binary Attribute Data Relations or BADR. In the example presented here, the BADR semantically represents "contextual information" where the list of data-topic items in 9 represents a "TYPE OF" relationship with heading 10, books written in "English," an end-user selection made in the most recent list menu 6.

List header 10 and list 11 of data-topics represents a "one-to-many" relationship. This relationship is central to this disclosure because it characterizes a binary attribute data relation or BADR, the newly discovered data relation that is disclosed by this invention and that will be described in detail shortly.

Each time an item in list menu 11 is selected by an end-user, the interface generates a new data-topic list menu 6 that narrows or refines the selected data-topic according to the underlying logic of data relations in the database. At the end of each menu path, content menu 5 displays an information window that furnishes detailed information sought by the end-user that is managed by the database. The linkage between this menu path and the information window is based on a primary key, a unique identifier associated with each record in the database table.

Alternative embodiments of content menu 5 include graphical interfaces that represent nested data-topic lists in a tree-view GUI interface and or in a list of nested hypertext lists. Embellishments to the preferred and to the alternative embodiments of these navigation structures include graphic icons and sound clips as topic entries.

Figure 2:
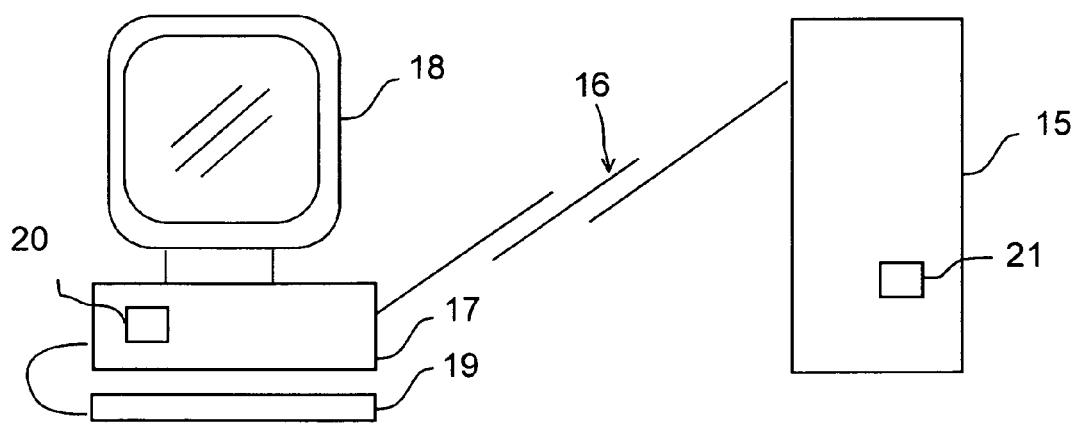
FIG. 2 depicts the client server network apparatus of the present invention.

The client server network apparatus of the present invention is depicted in FIG. 2. Client computer 17 is electronically linked to server 15. Network 16 includes any combination of physical cabling and wireless connections. Server computer 15 has CPU 21 that is responsible for preparing menu data for content menu 5. Client computer 17 also has CPU 20 that enables it to display content menu 5 on monitor 18. An end-user on client device 17 employs an input device like keyboard 19 to make selections and or to input text in order to use and navigate content menu 5.

Alternative input devices on client 17 include touchscreens, pointing devices like a mouse, voice-activated systems, and other types of sensory input devices that would enable an end-user to make selections in a content menu. The monitor 18 of client 17 displays the content menu visually as a graphic image; alternative output devices include "talking software" systems that would enable an end-user to receive auditory descriptions of the content menu.

Alternative embodiments to the network configuration of the present invention include a stand-alone computer configuration where the menu data associated with the content menu resides on a local data storage device. Alternative embodiments to the stand-alone computer or to the client computer 17 also include any computing device, regardless of its size or sensory interaction, that communicates with an end-user by presenting information actually requested by that end-user.

Figure 3:
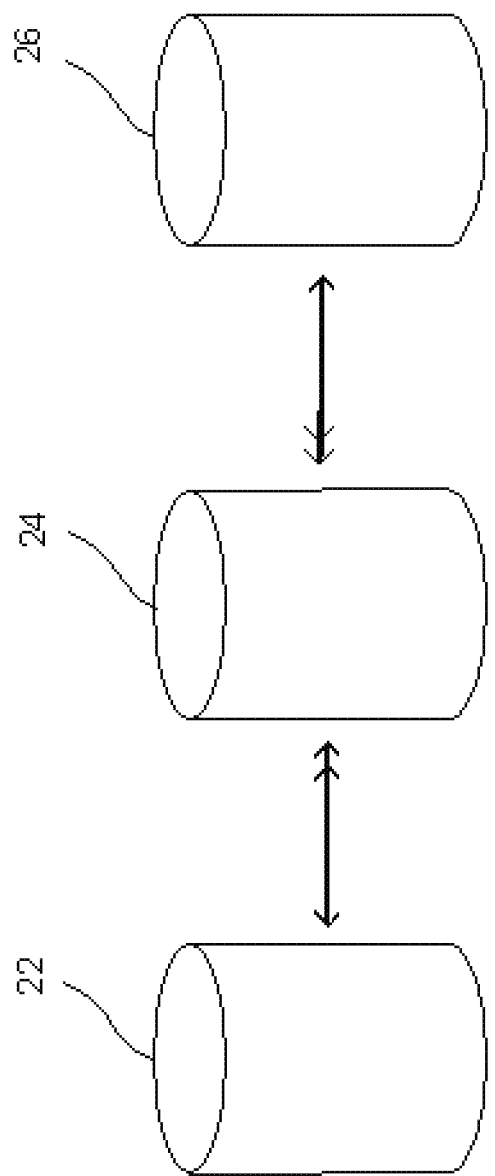
FIG. 3 depicts the three major software components of the content menu: a development system that generates menu data files, menu data files, and client software that displays the content menu.

The major software components of the prior art of the content menu 5 are graphically depicted in FIG. 3. One component of this prior art is a development system 22 that prepares menu data files 24 for content menu 5. Browser software 26 on client 17 displays content menu 5 based on menu data in file 24. The actual software architecture for client/server network 16 can be either server- or client-based depending upon the engineering requirements.

In the prior disclosure, development system 22, on computer device 15, builds and maintains an open hierarchical data structure (OHDS) that organizes all menu data into a single data structure before it can be assigned to a specific compiled menu data file In this context, development system 22 employs OHDS 68 as a framework with which to generate a series of compiled files 24 for content menu 5. Each compiled menu data file 24 represents a mutually exclusive segment of OHDS 68. The maximum size for each file 24 set by the developer in development system 22 to optimize the network and server performance for this menu system.

In the disclosure presented herein, development system 22, on computer device 15, introduces new software algorithms and program logic. These improvements streamline both the meta-query data as well as the algorithms that generate menu data files for content menu 5 on server 15.

In the preferred embodiment of the present invention, development system 22 resides on computer device 15. It maintains menu data files 24 and its meta-query data on server 15 as well. In an alternative embodiment of the present invention, say on a stand-alone system where both the target database and the browser software 26 reside on the same computer, development system 22 can reside on the same machine as well. Or it can maintain menu data files 24 and meta-query data files on this same computer or on any other computer in the network. In other words, development system 22, menu data files 24, meta-query data, and the target database files can reside anywhere in a connected network.

To demonstrate the present disclosure, as well as to refer to prior disclosures on which these improvements are based, a relational database that manages an inventory of books will be used as an example. Target database application 35 includes three different tables or entities: Book_Desc 40, Book_Authors 50 and Book_Publishers 60. Each row or entry in Book_Desc 40 depicted in FIG. 4a, such as 47, represents a book in this inventory. Each book in table 40 has data that corresponds to Book_Title 44, identification number or BID 42, and Book_Language 45. Other descriptive information about each book—in accordance with the relational model—is contained in the Book_Authors table 50 and Book_Publishers table 60 which have a one-to-many relation to Books_Desc table 40.

At this point in the discussion, it is important to note that each relational table in database system 35, such as Book_Desc 40, Book_Authors 50, or Book_Publishers 60, is a two-dimensional logical structure consisting of columns or fields and rows or records. In relational database terms, these two dimensions can also be identified by attributes and tuples. The terms attributes, fields, and columns all identify the vertical dimension of this structure, and they all can be used interchangeably without altering their meaning. The same is true for the terms that can describe the horizontal dimension of this structure, namely rows, records, and tuples.

In the relational model, columns or attributes can refer to data values that describe an entity in the relational table, like Author 52 in table 50 that refers to an author's name. Data values in other attributes can serve as value-based links between tables. This includes BID 42, a primary key in table 40 as well as AID 43 or PID 46 in table 40 that are foreign keys. These two keys, a primary key and its corresponding foreign key, form a pair of keys that give the relational model its distinctive value-based navigation capabilities that is described by Atzeni et al. This pair of keys enables rows in one table to link to rows in another table.

In this new disclosure, the functional distinction between attributes that manage data describing the entity versus attributes managing link data is fundamental. Attributes that are declared as primary and foreign keys in the schema, or employed in that manner, are identified in this new art as operational attributes or 48. A primary key or 48a represents a unique data value for each tuple or row in a table that can link to descriptive attribute data in another table of the database system. Therefore, primary key 48*a* and foreign key 48*b* complement one another by establishing a value-based linkage between two tables. All other attributes in the table structure, by default, are considered conceptual attributes; that is, these attributes manage data that describes something about an entity modeled by the table. This distinction between operational attributes 48 and conceptual attributes 49 in a table will be made throughout this disclosure.

In Codd's seminal 1970 ACM paper that introduced the relational model he addressed this distinction between attributes, but only in a very general way. In contrast, this specification makes a point of stressing this distinction by showing in very concrete ways how these two different attributes play an essential role in exposing semantic relations at the data level. In the final series of figures of this disclosure, FIG. 12*a* through 12*d*, show how data from two conceptual attributes 49 form a particular type of binary attribute data relation that the inventor identifies as contextual information. Other types of binary data relations are based on operation attributes and their data in either one or both attributes in a pair of attributes. And so, this distinction between conceptual and operational attributes and their pools of data is very basic and it will be raised repeatedly throughout this disclosure.

Lastly, in a database table records, or in relational terms tuples, play a vital role in understanding this new approach taken by the inventor. Structurally, they represents the horizontal dimension of the table, such as row 47 in table 40. Operationally, these records serve as a fundamental way for relating a data value in one attribute to data values in another. In fact, the central understanding of binary attribute data relations relies extensively on this horizontal dimension expose binary attribute data relations. Prior to this disclosure, no one had considered how these two dimensions—attributes and tuples—interacted with each other in the database table. By considering the simplest case, namely two attributes in a binary attribute relation and the records or rows that form a bridge between them, the inventor is able to identify and classify the binary attribute data relations that are responsible for construction of the Database Taxonomy displayed in content menu 5.

Figure 5:
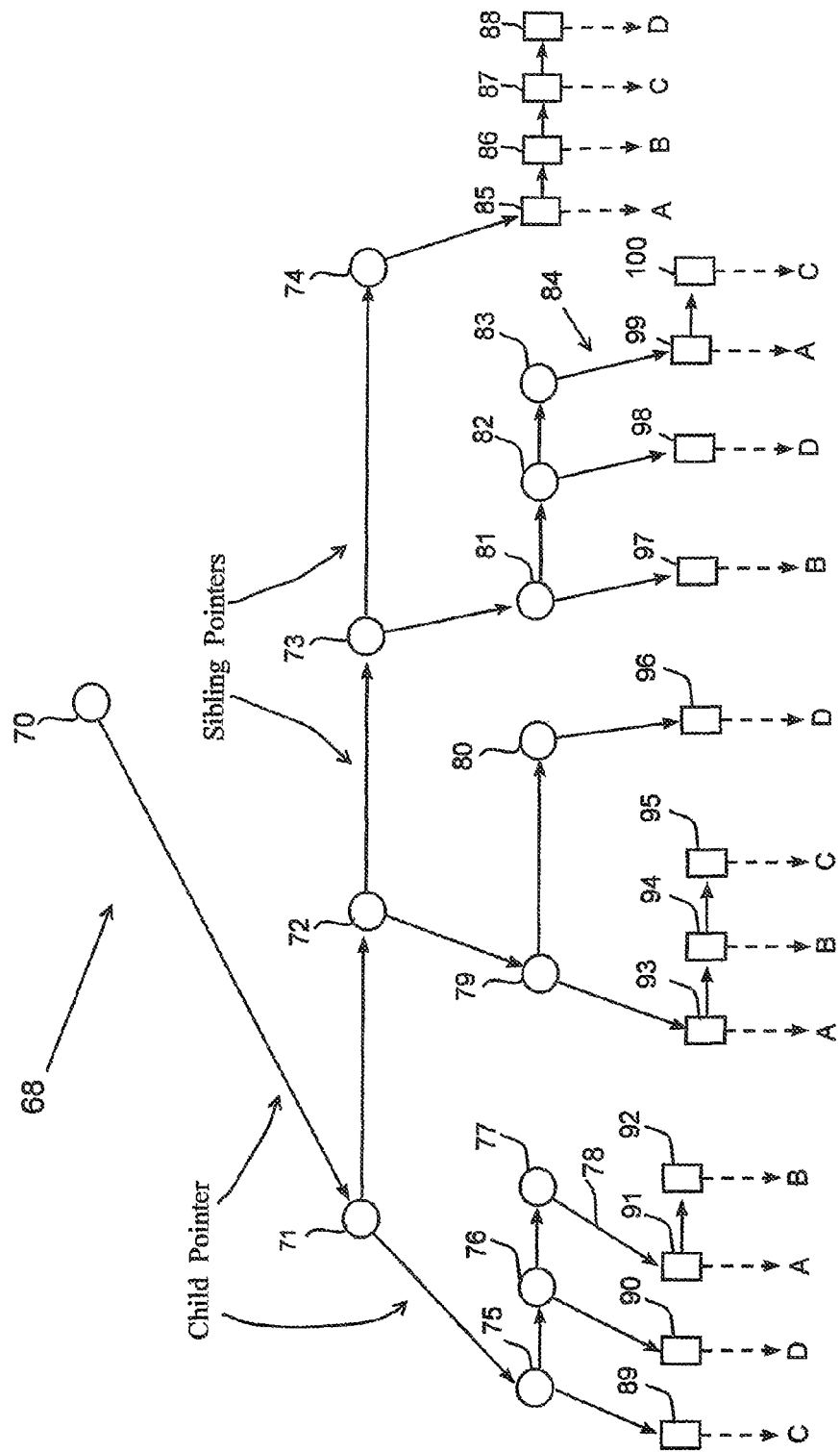
FIG. 5 depicts the open hierarchical data structure (OHDS) that represents the structure of menu data for the content menu.

A graphic representation of the open hierarchical data structure or OHDS 68 (a. k. a. the k2H) is depicted in FIG. 5. As mentioned in the Background section, structure 68 organizes menu data for content menu 5. Its structure is somewhat similar to the LEFT child—RIGHT sibling data structure described by Knuth. However, OHDS 68 goes well beyond the simplicity of a data structure. For instance, in order to build and maintain OHDS 68, development system 22 has its own graphical user interface that enable developers to add and modify topics by hand. Other tools in development system 22 populate structure 68 automatically by mapping data and data relations in a target database, such as 35, directly to leaf nodes in structure 68. Lastly, given the fact that any branch or leaf node in 68 can have more than one parent, all of these advanced capabilities distinguish OHDS 68 markedly from the simple memory management structure described by Knuth.

Flow in OHDS graph 68 starts at root node 70 and continues downward through one or more branching nodes, like 71 or 72, to leaf nodes like 89 that serve as link to information windows. Branching nodes in OHDS 68 have two different pointers that contribute to the construction of content menu 5. A sibling pointer on a branching node, such as on node 73, establishes the basis for a list of data-topics like list 11 in list menu 9. The child pointer on each branching node in OHDS 68 links each data-topic to a successor list. At the end of each path in OHDS 68, one or more leaf nodes can link to the same information object, like leaf nodes 92 or 94.

Data associated with each node in 68 is stored in database structure 104 depicted in FIG. 6. Each row in 104, like 110, represents a node in 68, such as the root node 70. Alternative embodiments of storing menu data associated with structure 68 include predetermined file formats, as well as other types of database architectures or file and directory structures.

Lastly, database structure 104 provides the framework for compiling menu data into one or more menu data files 24 for the content menu 5. An alternative embodiment of such compiled data files 24 includes the new approach taken by this disclosure that shows how to generate menu data file 24 at runtime that will be presented shortly in more detail with the description of FIGS. 10*b* and 10*c*.

Figure 7A:
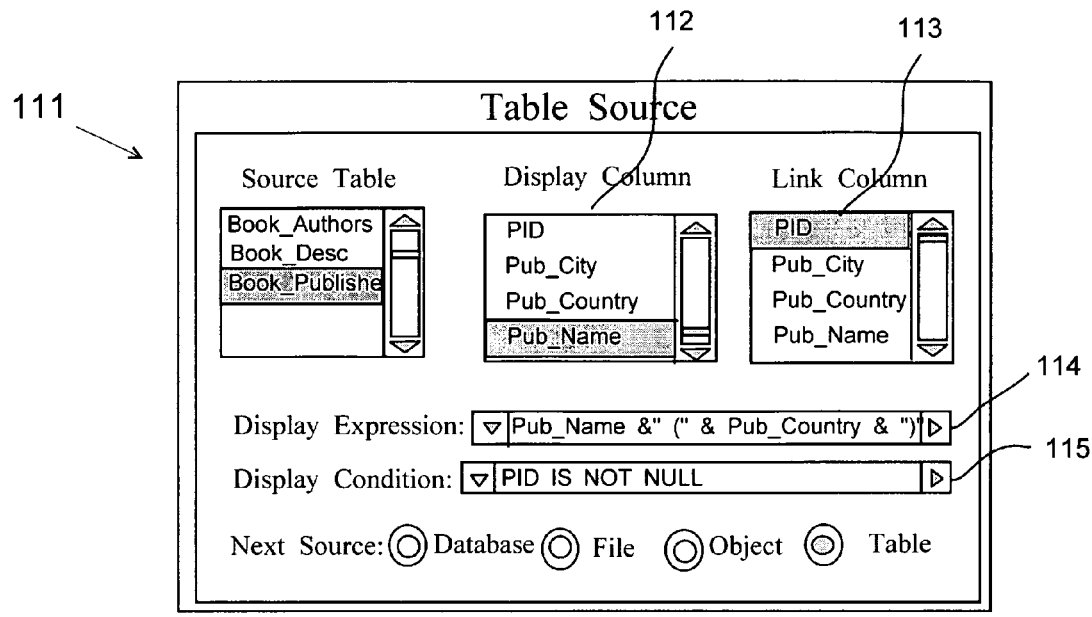
FIGS. 7a through 7c depict the prior art of the developers GUI and the software processes used to generate a symbolic expression that encodes meta-query data used to generate menu data for the content menu.
Figure 7B:
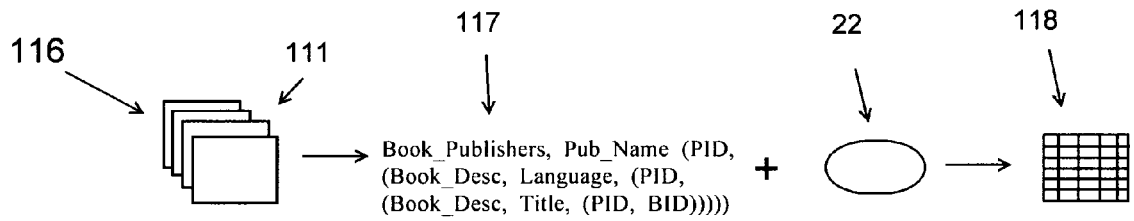
Figure 7C:
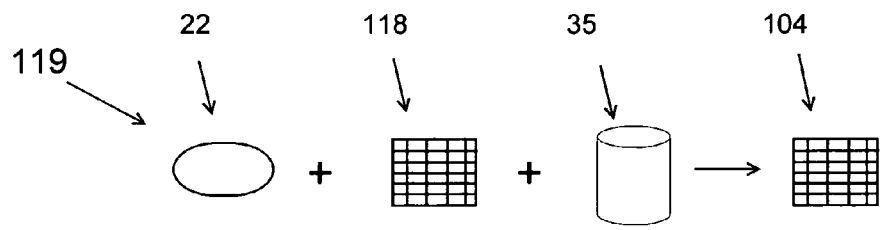

An overview of the prior developer's graphical user interface 111 and the program flow of meta-query data is displayed in FIGS. 7*a* through 7*c*. These figures show how this interface captures meta-query data from target database 35, how it is represented, and how these prior techniques employ this meta-query data.

The first figure of this series, FIG. 7*a* displays menu interface 111 employed by a menu developer to generate symbolic expression 117 that encodes meta-query data. In 111, the developer selects an item from Display Column 112 and from Link Column 113 to capture meta-query data from target database 35. For instance, the selections made in 111 of FIG. 7*a* would furnish meta-query data that would be responsible for displaying the publishers' names in scrolling list 11 of list menu 6 in content menu 5. This list of names is based on data values in Pub_Name attribute 62 of Book_Publishers table 60.

Interface 111 can also capture other types of meta-query data. This includes built-in functions, keywords, and schema labels in field 114 that control how output data is formatted and displayed. It also includes any conditional clauses in field 115 to add more precision to a selection condition.

The flow of program control in the prior algorithms that support interface 111 are displayed in FIGS. 7*b* and 7*c*. Program flow 116 in FIG. 7*b* starts with interface 111 and culminates with development system 22 depositing meta-query data into structure 118 from symbolic expression 117. Program flow 119 in FIG. 7*c* starts with program logic in development system 22 that fetches meta-query data from structure 118 to extract data from target database 35. This meta-query data is used to populate OHDS 68 in database structure 104 in order to generate compiled menu data files 24.

In this new invention, new program logic in development system 22 streamlines the two-step process of program flow 116 in FIG. 7*b*. In the prior program logic, selections made by the end-user were first transformed into symbolic expression 117, step one. Next, the old program logic in development system 22 parsed expression 117 to extract out meta-query data and store it in structure 118, step number two. In the new technique, program logic associated with interface 111 captures selections made by the end-user and stores them directly into structure 118, thereby skipping the need to generate logical expression 117 and then parse its content in order to isolate its meta-query data.

Figure 8A:
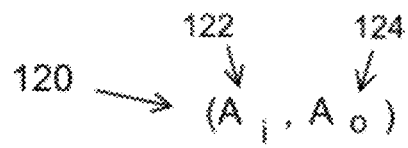
FIGS. 8a through 8c depict the new symbolic expression of meta-query data that is introduced by this disclosure as the Binary Attribute Relations or BAR.
Figure 8B:
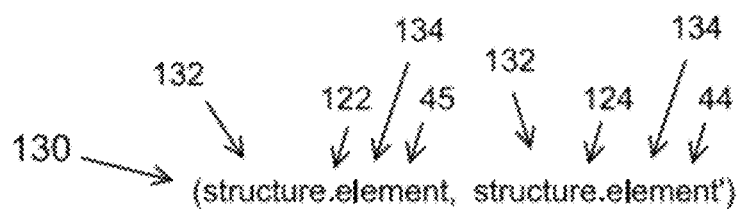
Figure 8C:
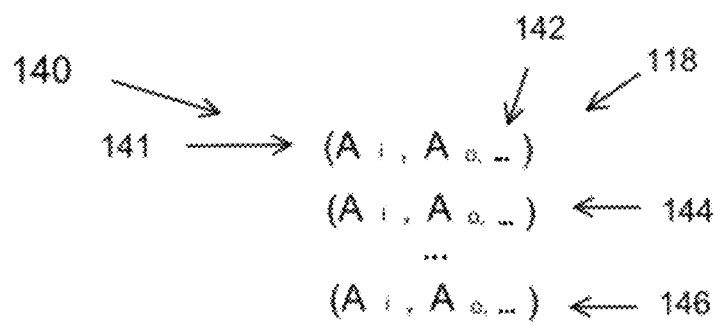

FIGS. 8*a* through 8*c* depict the new symbolic expression of meta-query data based on the Binary Attribute Relation (BAR). The terms in a BAR symbolic expression correspondence to the labels taken from database schema. This new expression provides a framework for how these selections should be viewed operationally as meta-query data, and how they can be stored directly into storage device 118 on a computer. It should be noted that in this new approach to meta-query data the BAR represents a pair of attributes that function as input and output channels to a retrieval operation. This new view was bought about by the BAR query, a topic that will be presented shortly in FIG. 11. This new symbolic expression of meta-query data represents not only the most compact and efficient way to store this data, but to deploy it as well. Using a character string template for a query statement, algorithms in development system 22 can map this meta-query data to build a BAR query at runtime. The details on this can be found in the discussion of FIG. 11.

In both the BAR and the BAR query, a pair of attributes represent a logical relationship that can be found between two pools of data in a data system. One attribute represents a source for the binary attribute data relation or input, the other represents a destination or output. It is important to note that these two attributes have something structurally in common. In the relational table, it is the horizontal dimension of this structure, namely its tuples, records or rows. In other data models, this structural commonality can be rows, records or any other types of structural elements which would allow two attributes, columns or fields to map data from one to the other. Yet, no matter what the technical setting, there is another, more striking commonality, notably that all retrieval operations can be viewed as a "black box" that can be characterized as a input and output process.

The BAR query exemplifies this simplicity. It has three fundamental components: an input clause (see 220 in FIG. 11), an output clause (see 225 in FIG. 11), and a variety of interchangeable keywords, logical symbols, structural references to data systems, and syntax which can be represented in an abstract way. And so one can see how the BAR query is a retrieval operation that can easily be generalized, giving rise to the BAR query as retrieval method that can easily be applied to all data models.

In the relational database, the BAR query employs pattern matching on a retrieval condition that is a physical-value used to locate relevant records, rows or tuples. When the system encounters redundant values at the intersection of an input attribute and its records, the retrieval operation returns output from multiple records. Using a physical data value as a retrieval condition on a single input attribute enables one to reduce the inherent complexity of the relational table. However, even in this carefully controlled setting, the mapping between an input data value and its output can be quite unpredictable, as indicated earlier. In some instances, this query yields a list of output data and a one-to-many (1:M) pattern. And in others, such as when an input value matches only one tuple and the operation returns a single output data and the mapping is one-to-one (1:1). By exploiting the mechanical features of physical symbols, and by applying this knowledge to retrieval operations, the BAR and BAR query is able to overcome the arbitrary nature of such 1:1/1:M data relations by simplifying the query to input and output attributes.

The first figure in this series, FIG. 8*a* depicts the notation for a Binary Attribute Relation or BAR 120. The left and right parenthesis in this symbolic expression signify that a logical relationship exits between these two attributes. Both are, in fact, variables: an input attribute $A_i$ 122 and an output attribute $A_o$ 124. The left position of this attribute pair is always input 122 and the right position is always output 124. Each variable in this symbolic expression stands in for an attribute that was declared in the same database table. Note, that BAR expression 120 can also refer to a single attribute in a database table that has a reflexive relationship with itself.

Operationally, the attributes in a BAR expression can be directly applied to a BAR query as input and output. In a Structured Query Language (SQL) SELECT demonstration of this, which will be presented shortly in detail in FIG. 11, these attribute labels represent all the essential components required for the BAR query to expose a binary attribute data relation or BADR. As indicated earlier, input attribute 122 is represented by a selection made in Link Column 113 of interface 111. This selection forms the basis for input clause 'WHERE $A_i$=v alue,' where value is always an element of Ai. Output attribute 124, on the other hand, is represented by the Display Column 112 selection of interface 111; it specifies the output channel for the BAR query.

The next figure in this series, FIG. 8*b*, depicts BAR expression 130 using an attribute label drawn from a database table, like Book-Title 44 of table 40 for input 122 or AID 43 of 40 for output 124. The attribute label can also be preceded by a table label 132 such as Book_Desc 40. In BAR expression 130, the table name prefix 132 corresponds to the schema label that would be used to access a table. When this table label is applied to BAR expression 120 on the left below, it takes the form of BAR expression 130 on the right, (Language, Title) (Book_Desc.Language, Book_Desc.Title).

The last figure of this series, FIG. 8*c* graphically presents an outline of storage structure 118 that manages meta-query data according to the new BAR notation 120. This new meta-query storage art introduces a new format 140 that centers on BAR 120, and by extension BAR 130. Program control in development system 22 enables a content menu developer to navigate over target database, like database system 35, using a graphical menu interface 111 to create BAR 130 by selecting items from scrolling regions 112 and 113. Interface 111 now extracts these selections as BAR 130 components, along with any related meta-query from fields 114 and 115, and stores them all directly in meta-query structure 118. Each BAR 130, and its related meta-query data 142, is stored in a predefined sequence: an initial entry 141, one or more successor entries like 144, and a final entry like 146.

An alternative embodiment of structure 118 depicted in FIG. 8*c* stores a single attribute for each unit of meta-query data, thereby eliminating redundant meta-query data. This alternative format of structure 118 is identified as the "Short-Form" of BAR 120, by extension Bar 130. This "Short-Form" employs its own specially-designed algorithms to map into the format of the preferred embodiment.

Figure 9:
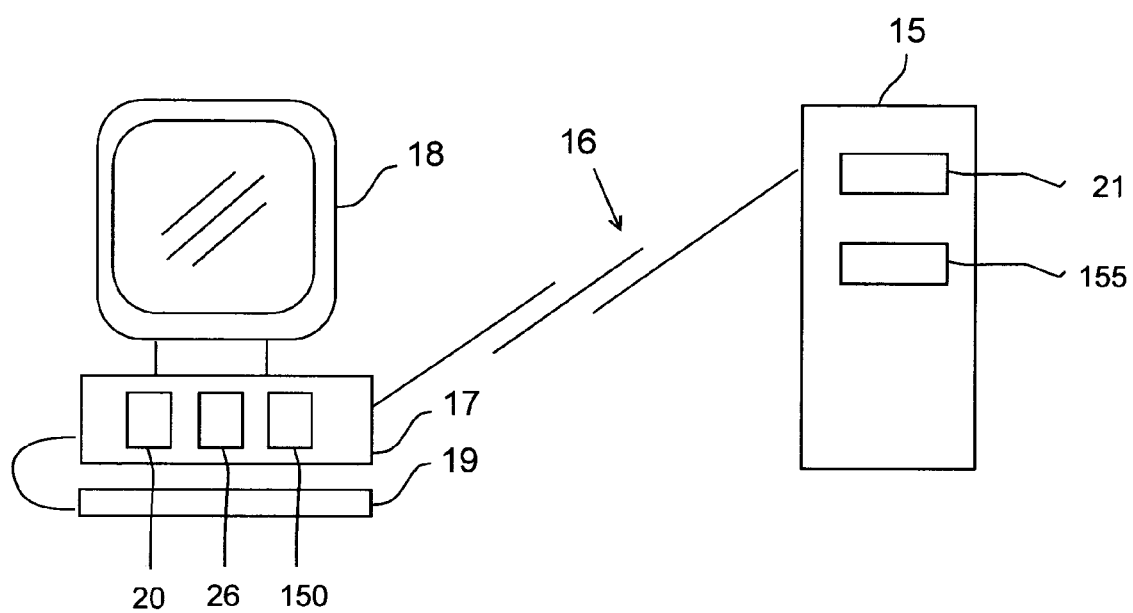
FIG. 9 depicts the client server network apparatus of the present invention, showing the new software components introduced by this disclosure.

In the next diagram, FIG. 9 presents a graphical image of the new software components in one embodiment of the client server network apparatus presented in FIG. 1. On server 15, this includes session controller 155 and an algorithm that managers the individual sessions associated with each client 17. In turn, client 17 has a cookie 150 and software that maintains persistent data about an individual's navigation on the content menu 5. This includes a unique session ID that distinguishes one client session from another. Software cookie 150 also maintains persistent data such as a start-time stamp, the current list menu 6 in 5, as well as other parameters and metrics related to the end-users activities on content menu 5. Software 26 on client machine 17 is responsible for furnishing some of these parameters, and session controller 155 on server 15 maintains others. In an alternative client server embodiments the server software initiates and maintains all of these parameters.

On client 17, browser software 26 in this new art is capable of displaying list menu 6 for content menu 5 deploying two different types of menu data files 24: compiled and runtime files. Both types of files 24 include menu data for one or more list menus 6 of content menu 5. The compiled menu data file 24 is generated during a production run using structure 104 to generate one or more data file 24. These files can be built anywhere, and they can be stored on server 15 or on another computer that is accessed by server 15.

The compiled menu data file 24 has the advantage over runtime 24 by conserving network and server resources, at the expense of delivering static and possibly out of date data. In contrast, a runtime menu data file 24 is generated on demand, when a request for specific list menu data is made either by the server 15 or by program logic on client 17. The runtime menu data files 24 contains "live" data.

Figure 10A:
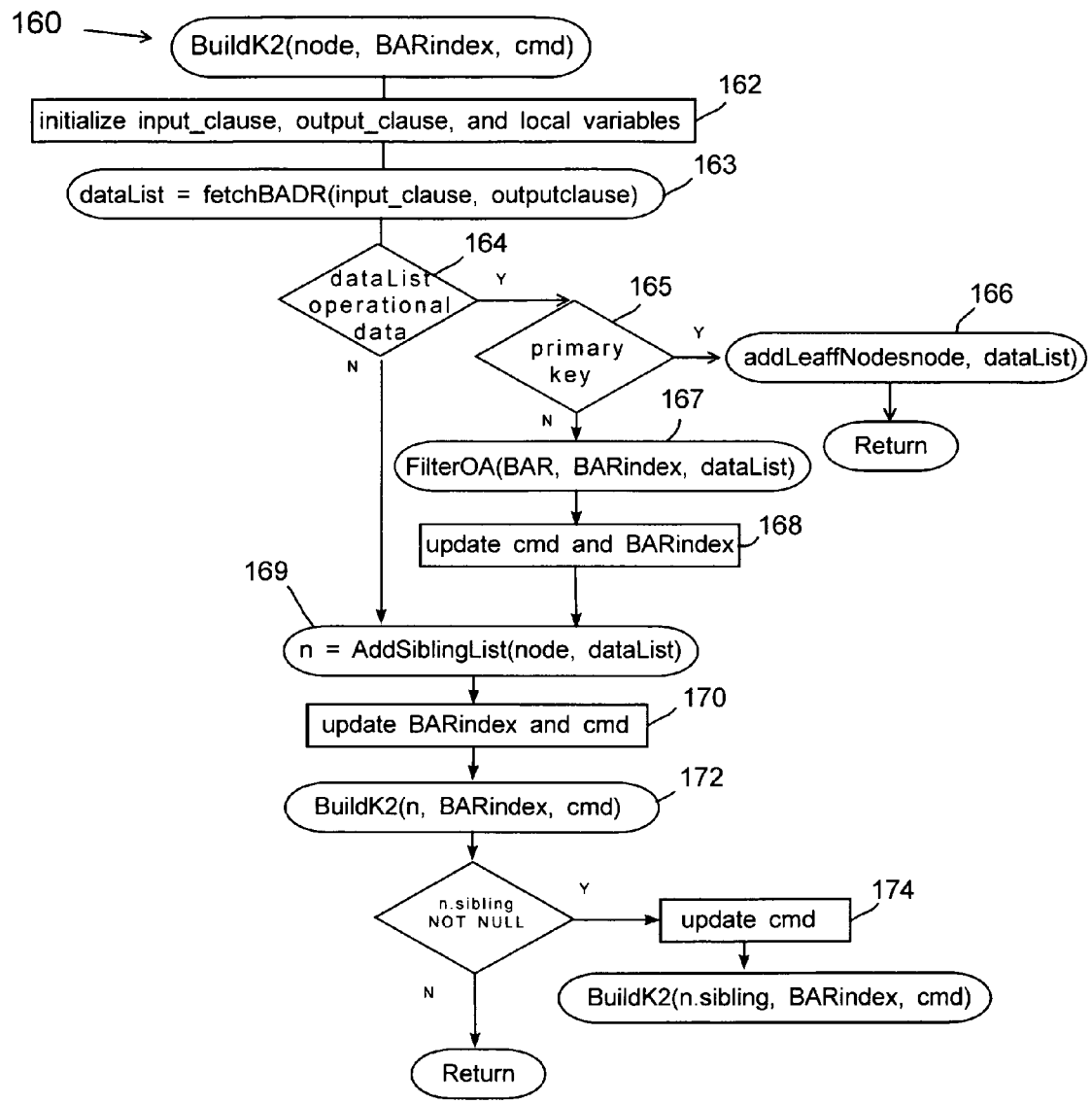
FIG. 10a through 10c depicts the flow charts and program control of the algorithms responsible for extracting binary attribute data relations (BADR) from a target database and for constructing compiled and runtime menu data files for the content menu.
Figure 10B:
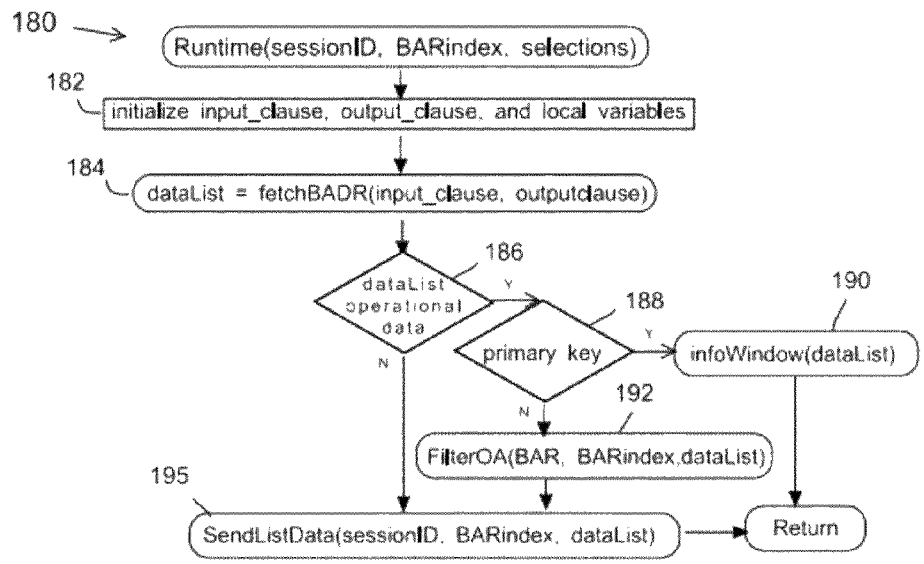
Figure 10C:
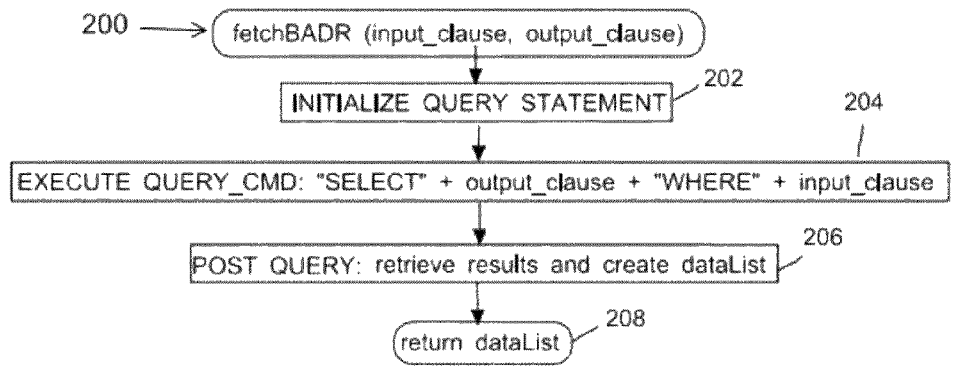

In the next series of figures, FIG. 10a through 10c depict the program control used to generate menu data file 24. Program control in the development system 22 establishes and maintains a connection to remote database 35 for all interface 111 operations and for retrieving data and data relations from remote database 35.

FIGS. 10a and 10b represent the new algorithms used to create two different types of menu data files 24: one runtime and the other compiled. In both instances, the program logic used build these files employ the same meta-query data, even though one list menu 6 in content menu 5 displays "live" or runtime data-topics, and an other menu 6 in content menu 5 displays "static" or compiled data topics based on menu data file 24 retrieved from memory. In addition, both algorithms employ the same program control to build a BAR query at runtime and extract BADR data relations. The last figure in this series, FIG. 10c, shows how the BAR query is constructed and executed, and how the results are returned to the calling program in FIGS. 10a and 10b as output data associated with the BADR.

The first figure in this program control series, FIG. 10a depicts program logic 160 that builds OHDS 68 for generating compiled menu data files 24. As indicated earlier, development system 22 builds OHDS 68 at scheduled production times. After development system 22 builds OHDS 68, an algorithm in 22 traverses 68 to segment it into mutually exclusive networks according to a prescribed optimal size configured by the developer. These networks are then redirected to one or more menu data files 24. Each compiled file in 24 contains at least one list of data-topic lists that describe content in remote database 35.

Development system 22 calls 'BuildK2' 160 to populate OHDS 68. It passes a node value in 104, like node 70, an index into BAR structure 118, and cmd, a conditional command string that eliminates any unwanted values, such as the NULL value. 'BuildK2' 160 is a recursive algorithm. At 162, routine 160 initializes local program variables. Next, program control calls fetchBADR at 163 to extract a list of data from remote database 35. The program logic for fetch-BADR is depicted in FIG. 10c.

The type of data fetchBADR returns to 'BuildK2' 160 is crucial in showing how this recursive routine constructs OHDS 68. If the data values represent operational data then the result is treated differently from data that is conceptual data. The latter data is used as menu data-topics, while the former serves as value-based links to such information. The difference between these two types of data helps to classify binary attribute data relations according to how they are used to construct the content menu 5.

When routine 160 determines at 164 that fetchBADR has returned a dataList that represents operational data, it then tests dataList again at 165 to see if it represents primary key 48a functionally that would signify a final BAR index. If dataList is a primary key or it represents conceptual data, routine 160 calls AddLeafodes to add dataList as to a leaf node of structure 68 in 104 as a sibling list. Otherwise, the operational data in dataList refers to data values that eventually link to conceptual data. In this case, routine 160 calls FilterOA at 167 to cycle through this operational data in order to reach conceptual data that can be used as data-topics in content menu 5.

When fetchBADR returns a dataList that represents conceptual data, or a list of data values that functions that way, routine 160 calls AddSiblingList at 169 to create a sibling list in OHDS 68. Next, 160 updates local variables before it makes a recursive call to itself at 172. Upon returning, 160 checks if the current node or n in 68 has a sibling. If a sibling node is detected, routine 160 updates the cmd string with a new input clause that replaces the prior one, and then calls itself to continue its recursive depth-first tree-growing pursuit.

In the next figure in this series, FIG. 10b displays program control 180 that is used to generate runtime menu data file 24 for content menu 5. Session controller 155 on server 15 calls runTime routine 180 and passes the sessionID, the BARindex or vector in 118, and the current scope of selection conditions.

At 182, routine 180 initializes program control variables that are applied to the BAR query, including its input and output clauses. At 184, routine 180 calls the fetchBADR 200 displayed in FIG. 10C. This program control builds source code for the BAR query and then executes this operation to extract output from remote database 35.

At 186, program control in 180 determines how to deploy the dataList returned by fetchBADR. Routine 180 either sends dataList back to the program control that prepares display data for client 17 or it treats this data as representing operational data. As mentioned in the last figure, operational data either links to more conceptual data or to an information window. At 188, if this operational data represents a primary key 48a at the end of a BAR chain then routine 180 calls info Window at 190 to build and return a window object to the browser 26 based on that primary key. Otherwise, routine 180 cycles through the operation data lists by calling filterOutOA at 192 till it reaches another instance of conceptual data.

The streamlined approach of the new program control in is based on modularity and on the simplicity of subroutine fetchBADR 200 that both routine 160 and routine 180 call. The fetchBADR routine 200, depicted in FIG. 10c, builds source code for the BAR query; executes it against target database 35; and returns the results. Routine 160 uses these relays to generate a compiled menu data file 24 and routine 180 employs them to create a runtime menu data file 24.

At the start, routine 200 initializes local program variables at 202. Next, at 204, routine 200 builds the command string and executes the retrieval operation on database 35. And, finally, routine 200 parses the results of this operation at 206 and re-formats them for the calling procedure.

The actual source code for building a BAR query is generated by routine 200 at 204 which it treats this retrieval expression as a template. For instance, this expression has an output clause, an input clause and a number of specific keywords, such as SELECT and WHERE. These keywords highlight the fact that this statement is structured according to by the specific query language. The source code for this statement is generated at runtime and then executed at runtime. In this example, the data extraction is conducted by a relational engine, therefore the SQL syntax is used to demonstrate a BAR query. Otherwise, this program logic builds a retrieval statement based on the syntax and keywords requirements outlined by the data system.

Figure 11:
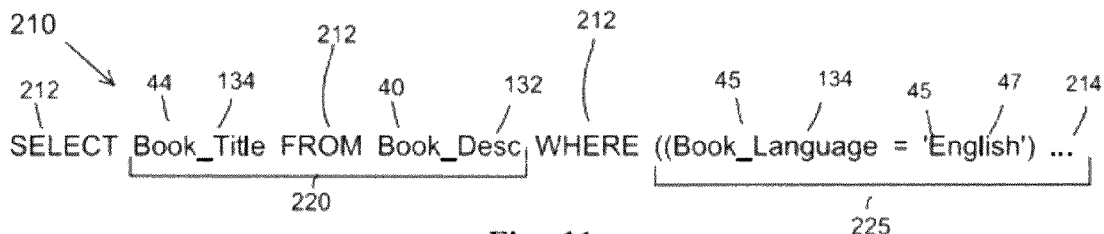
FIG. 11 is an example of a BAR query.

Finally, FIG. 11 presents an example of one type of BAR query source code that could be constructed by a routine like 200. This particular source code is depicted here in SQL, the universal data manipulation language associated with the relational database. The BAR query here represents a simplified query operation that pairs a single new data value with a new single input attribute along with the other prior selection conditions 214.

The first time that routine 200 is called, the source code here exemplifies the overall simplicity of the BAR and the BAR query. However, on each new recursive call, a new input attribute/value pair, or "$A_n=v_n$," is concatenated to any prior input conditions in order to extract the logically correct subset of output data from the current BAR. Therefore, one can and should differentiate a simple BAR, as truly having a single input attribute or "$A_1=v_1$," where $A_1$ is that attribute and $v_1$ is a data value that can be found in $A_1$, from an operational BAR. On the other hand, an operational BAR, like the one presented at 210 in FIG. 11, has a single, new input attribute/value pair, "Book_Language='English'" which is concatenated to input_clause 214, which includes one or more previous input attribute/value pairs built up by each recursive call, to recreate the proper logical context, i.e., "((Book_Language='English') AND ($A_2=v_2$) AND ($A_1=v_1$))".

The source code associated with expression 210 shows the components of the preferred embodiment of a BAR query in a SQL SELECT statement. The formal nature of this expression shows just how easily it can be generalized across other query languages. Source code 210 is composed of keywords 212, symbols 214, and a syntax (a prescribed sequence of keywords and symbols) that designates an input clause 225 and an output clause 220. It is important to note that in spite of its universal status SQL it still has multiple dialects that can impede portability. But with the inherent simplification of the BAR query, i.e., reducing the query language to input and output, even these subtle, yet annoying language differences can be avoided completely.

After seeing the simplicity of these BAR query components, it should be noted that alternative embodiments of routine 200 can generate source code for retrieval operations that can be applied to any data files that have predefined file formats. This includes any data management system, including even well-defined data files, because they all essentially use labels, names, or numeric references and expressions to differentiate one pool of data from another. In addition, they all employ retrieval operations that essentially treats one pool of data as input and another as output. Therefore, the SQL SELECT statement in FIG. 11 presents just one example of how to expose a BADR that naturally exists between two pools of data in a data management system.

In the last series of figures, FIG. 12a through 12d depict the four different types of data relations that can be expressed by a BAR query such as statement 210 in SQL. These different types of data relations represent the complete set of binary attribute data relations or BADR 250 derived from a BAR query. In each instance, a physical data value v specifies a retrieval condition on input attribute Ai in BAR 120. This physical data value also happens to represent an existing data element in the Ai attribute whose data values can be found at intersection of attribute 45 and row 47 in table 40. This input condition, $A_i=v$, regardless of the possibility of any deeper logical constraints, is responsible for creating the one-to-one or one-to-many relationship with the output data returned by BAR query.

The relationship between v and its output data is logically determined and based. It has been identified throughout this disclosure as a binary attribute data relation or BADR that it is depicted in FIG. 12a-12d. The discovery of this data relationship was made possible by observing the construction of OHDS 68, which has been shown to use two different types of data: conceptual and operational data values, as evidenced by program control 188 in 180.

This new disclosure advances a deeper understanding of relational data by introducing the concept of meta-query data. Meta-query data is data that can be applied to the construction of a query statement at runtime to extract data and its relations. This meta-query data is important in two crucial ways: 1.) it focuses on a pair of attributes that serve as input and output channels in a BAR query, and 2.) it also relies on the fact that all target conditions self reference an input attribute to extract data. This new view of linking data from one attribute to another by way of their commonality, namely records, tuples or rows, was and is unconventional.

Other unconventional approaches employed by the inventor express selection conditions that exploits the fact that retrieval operations use pattern matching on physical-values to locate relevant record-based data. This, and the fact that all output declarations are based on constructed-types, effectively means that all retrieval operations—regardless of the data model—operate on physical symbols in the same manner, at a mechanical level of operations. Therefore, the inventor asserts that relational data, and all data in all data models for that matter, is composed of two meta-symbols: a physical-value and a constructed-type. This understanding helps explain why the same attribute can work equally effectively as either input or output in a BAR query statement. It also enables the inventor to view the relationship between data and its attribute declaration in a strictly pragmatic manner, allowing him to ask how attributes and data contribute to what the end-user sees in the content menu.

With this new view of relational data in mind, FIG. 12a through 12d show all the different ways that conceptual and operational attributes—and their respective conceptual and operational data—can be paired together. Consequently, it creates an opportunity for classifying BADR 250 according to these pairings. Table 1, listed below, summarizes all the possible combinations of attribute pairings that can occur in BAR notation 120, employing the following intuitive notation: C for conceptual attribute 49 and 0 for operational attribute 48.

Early in this specification, the disclosure made a point of differentiating one type of attribute from another based on how each is declared in the schema. We are reminded now that conceptual attributes 49 manage data values that describe the contents of the table, and that operational attributes (primary and foreign keys) 48 manage data that links two tables together. It should be noted that the latter is responsible for giving the relational model its distinctive value-based approach described by Atzeni et al.

The first entry in Table 1, (C, C), designates a special type of data relation 250 that the inventor identifies here as contextual information., From the end-users' perspective—one data-topic in the content menu leads to another list of data-topics according to some, yet to be determined system of logic that governs the formation of the relational table.

Sometimes this logic is self-evident, for example in spatial or temporal oriented data, such as when the cities of Amherst and Concord follow the state of Massachusetts. At other times, however, this logic only makes sense from the perspective of a database application and the end-users' expectations of it, say when "January" or "February" follows "New England" in a sales tracking application.

Other designations in Table 1, namely (C, O), (O, C), and (O, O), all refer to the different ways that the relational model can link to Contextual Information. Therefore, these data relations are identified as Conceptual Linkage. These types of BARs represent data relations that either link away from a table, such as (C, O), or that link into a table, i.e., (O, C), or that represent pairs of keys within the same table that represent many-to-many relations, expressed by (O, O).

TABLE 1

| BAR | Represents |
| --- | --- |
| (C, C) | Contextual Information |
| (C, O) | Conceptual Linkage |
| (O, C) | Conceptual Linkage |
| (O, O) | Conceptual Linkage |

With this classification of binary attribute relations in place, the next step entails looking to see how these relations correspond to the formation of binary attribute data relations 250 and, more importantly, how they contribute to the formation of menu data for the content menu.

Figure 12A:
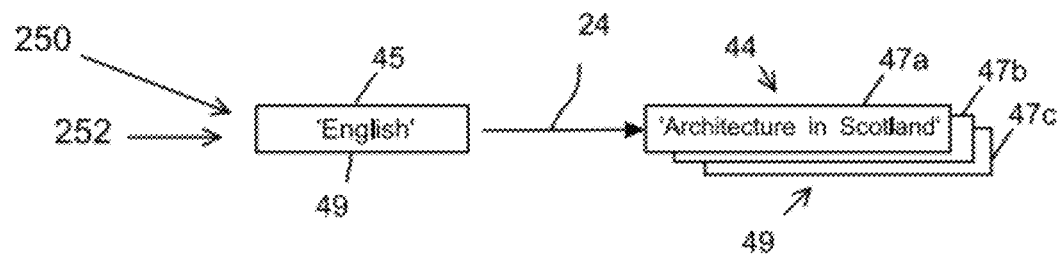

The first figure in this series, FIG. 12a represents conceptual-to-conceptual attribute pairing or (C, C). As mentioned earlier, this type of BAR—at the data level—depicts a specific type of BADR 250 that is contextual information 252. BADR 252 is a fundamental building block for the structure of menu data for content menu 5. In this particular example of a binary attribute data relation, the data and its data relation is drawn from two conceptual attributes that manage values that describe the content of a table.

From the end-users' perspective, the content menu displays contextual information 252 to help them move closer to the information they need in the database. Data values derived from output attribute serve as data-topics in list 11 of menu 9. I Input data values, on the other hand, serve as links to the prior list. In the next menu, each new data-topic serves as a condition for input 122 for the next BAR 120 in a chain of BAR. From content menu 5, the relationship between the data-topics in one list menu 6 and the next menu 6 is both operational and semantic, or—in more common terms—it is both useful in the construction of all the list menu and in making its contextual meaning clearer to the end-user.

In the example displayed in FIG. 12a, the list of book titles that follows after selecting "English" from the previous list highlights the semantic relation between these two lists. Linking a list of languages to a list of books written in that language make the process of looking up a book in a content menu 5 intuitive. Clearly, the BAR query that exposed this BADR 252, and the recursive algorithm that links between one list of data-topics to the next, enables end-users to view database content in a powerful, new format that is innovative, yet familiar because it is similar to an index which can be found in he back of a book.

Figure 12B:
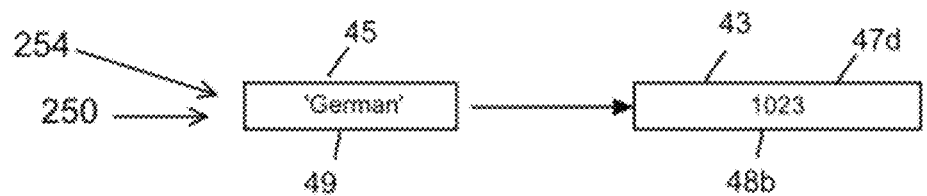

Other combinations of attribute pairings include the pairing of operational attributes, such as (C, O), (O, C), and (O, O). These attribute pairings enable an end-user to navigate from a list of data-topics drawn from one table in a database system to another. These pairings essentially serve up BADRs 250 that link to other conceptual data and to a primary key 48a in a final table destination. A complete inventory of these different types of attribute pairs can be found in FIG. 12b through 12d. For example, FIG. 12b depicts a relationship between a conceptual attribute and an operational attribute or (C, O). At the data level, it represents a type of BADR 250 where a conceptual input data value maps to output operational data, BADR 252. In the example presented in this figure, 'German', a data value from attribute 45 in table 40 is a conceptual attribute 49 that maps to '1023', operational data from 43 in table 40 that is a foreign key 48b. In another form of BADR 252, conceptual data maps to a primary key 48a such as BID 42 in table 40. In both instances, conceptual data binds with output operational data that lays the technical foundation in the content menu for navigating from one table in a database to another.

Figure 12C:
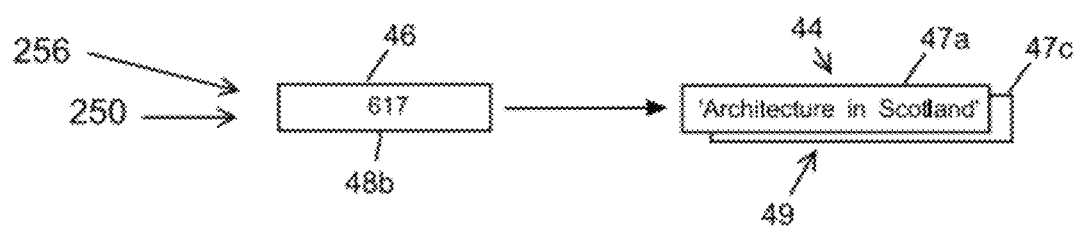

In FIG. 12c, the conceptual and operational attribute pairing is reversed, i.e., (O, C), in order to receive output data from an outside table that has value-based links to the input operational in this new table pairing. This pairing represents an operation-to-conceptual data relation 256. Once again, the operational attribute in this pairing can be either a primary key 48a or a foreign key 48b. In the example of data relation 256 depicted in the figure, the operational attribute depicts a foreign key 48b, 46 in table 40, and the conceptual attribute 44 in table 40.

Figure 12D:
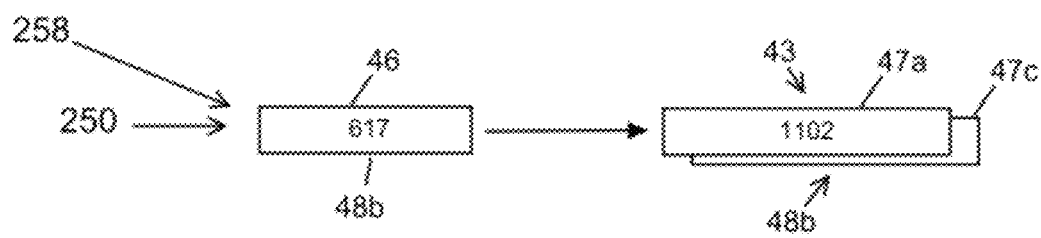

And, finally, an operation-to-operation BAR, or (O, O), is depicted in FIG. 12d. This type of BADR 250 pairs two operational attributes within the same table. In this example, the diagram depicts the pairing of two foreign keys 48b; it characterizes many-to-many data relations. These data relations are typically found in table of the relational model. Alternatives to this particular pairing include all other possible legitimate combinations of two keys in a many-to-many relationship such a primary key with a foreign key and a foreign key with a primary key.

CONCLUSION

This concludes the description of an embodiment of the invention. The foregoing description of the embodiment of the invention has been presented for the purpose of illustration and description. It is not intended to be exhaustive or limit the invention to the precise form disclosed. Many modifications and variations are possible in light of the above teaching, including software methods that would be less efficient or and would take longer to execute because they are not as precise and accurate as this technique. Therefore, the scope of the present invention is not intended to be limited by the specific examples presented in this detailed description, but rather by the claims appended hereto.

Having described an embodiment of the invention I claim:

1. A computer-implemented method on a computer processor for creating a binary attribute data relation between two attributes in a table of a data management system, wherein said binary attribute data relation is a primitive data relation derived from a binary attribute relation query, and for adding said binary attribute data relation to a structure of menu data for a content menu comprising:

creating a symbolic expression that reflects said binary attribute data relation derived from said table of said data management system;

storing said symbolic expression that reflects said binary attribute data relation in a storage device associated with said computer processor;

retrieving said symbolic expression from said storage device associated with said computer processor;

constructing a query statement by program logic that merges an element from said symbolic expression that reflects said binary attribute data relation with a plurality of keywords from a predefined query language for said data management system;

executing an algorithm that contains said query statement using a central processing unit on said computer processor to extract a list of data from said table of said data management system to construct said binary attribute data relation;

identifying how said binary attribute data relation contributes to said structure of menu data;

adding said list of data to said structure of menu data for said content menu, when said list of data functions as data-topics;

whereby said algorithm that contains said query statement is a self-contained component of a system that generates menu data for said content menu that is easier to deploy and simpler to maintain.

2. The computer-implemented method of claim 1 wherein said computer-implemented method is implemented in a computer language which is compatible with at least one operating system.

3. The computer-implemented method of claim 1 wherein said data management system has a structure which is compatible with at least one data model.

4. The computer-implemented method of claim 1 wherein said query statement is implemented in a computer language that is compatible with said data management system.

5. The computer-implemented method of claim 1 wherein said symbolic expression is composed of elements that are compatible with the formation of at least one query statement.

6. The computer-implemented method of claim 1 wherein said query statement has an output attribute derived from said symbolic expression that reflects said binary attribute data relation.

7. The computer-implemented method of claim 1 wherein said algorithm that extracts said list of data to generate runtime menu data for said content menu.

8. The computer-implemented method of claim 1 wherein said algorithm that extracts said list of data to generate a compiled menu data file for said content menu.

9. The computer-implemented method of claim 1 wherein said binary attribute data relation represents contextual information, where all data describe information modeled by said table of said data management system.

10. The computer-implemented method of claim 1 wherein said binary attribute data relation represents conceptual linkage, where at least one data value in said binary attribute data relation links one table to another table in said data management system to another.

11. A computer system for creating a binary attribute data relation between two attributes in a table of a data management system, wherein said binary attribute data relation is derived from a binary attribute relation query, and for adding said binary attribute data relation to a structure of menu data for a content menu comprising:

a graphical interface using a computer processor and memory on said computer system for creating a symbolic expression that reflects said binary attribute data relation in said table of said data management system;

an area in said graphical interface that displays an attribute label associated with said table;

a selection mechanism associated with said graphical interface that enables a developer to select said attribute label of said table and store said attribute label in a storage device on said computer system according to said symbolic expression that reflects said binary attribute data relation;

a retrieval program logic that fetches said attribute label in said symbolic expression from said storage device;

a query statement at a memory location in said computer system that merges said [structural element] attribute label with a keyword from a query language of said data management system;

an algorithm that executes said query statement using said computer processor on said computer system that extracts a list of data from said table, that determines how said binary attribute data relation contributes to said structure of menu data, and that adds contextual information to said structure of menu data for compiled files for said content menu;

whereby said algorithm that executes said query statement is a self-contained component of a system that generates menu data for said content menu that is easier to deploy and simpler to maintain.

12. The computer system of claim 11 wherein said data management system has a structure that is compatible with at least one data model.

13. The computer system of claim 11 wherein said query statement is implemented in a query language that is compatible with at least one data management system.

14. The computer system of claim 11 wherein said symbolic expression has at least one component that is compatible at least one query language.

15. The computer system of claim 11 wherein said query statement has an output attribute from said symbolic expression.

16. The computer system of claim 11 wherein said algorithm that extracts said list of data generates both runtime and compiled menu data files for said content menu.

17. The computer system of claim 11 wherein said binary attribute data relation represents conceptual linkage where at least one data value in said binary attribute data relation links one table to another table in said data management system.

* * * * *